US008599240B2

(12) United States Patent
Youn et al.

(10) Patent No.: US 8,599,240 B2
(45) Date of Patent: Dec. 3, 2013

(54) SUPER-RESOLUTION FROM 3D (3D TO 2D CONVERSION) FOR HIGH QUALITY 2D PLAYBACK

(75) Inventors: Jeongnam Youn, Sungnam-Si (KR); Alexander Berestov, San Jose, CA (US)

(73) Assignee: Sony Corporation, Tokyo (JP)

( * ) Notice: Subject to any disclaimer, the term of this patent is extended or adjusted under 35 U.S.C. 154(b) by 307 days.

(21) Appl. No.: 12/916,212

(22) Filed: Oct. 29, 2010

(65) Prior Publication Data

US 2012/0105582 A1    May 3, 2012

(51) Int. Cl.
*H04N 13/00* (2006.01)
(52) U.S. Cl.
USPC ............... 348/43; 348/42; 345/428
(58) Field of Classification Search
None
See application file for complete search history.

(56) References Cited

U.S. PATENT DOCUMENTS

| 2003/0128871 | A1 | 7/2003 | Naske et al. |
| 2010/0231593 | A1* | 9/2010 | Zhou et al. ............... 345/428 |
| 2011/0149019 | A1* | 6/2011 | Kellerman et al. ........ 348/42 |

FOREIGN PATENT DOCUMENTS

EP    1750460 A1    2/2007

* cited by examiner

*Primary Examiner* — Sath V Perungavoor
*Assistant Examiner* — Dakshesh Parikh
(74) *Attorney, Agent, or Firm* — Haverstock & Owens LLP

(57) ABSTRACT

A display is able to display 3D content in high resolution 2D by utilizing the many views contained in the 3D data and converting the 3D data into 2D data. In some embodiments, the 3D data is converted using shifts in different views of a pixel. In some embodiments, the 3D is converted using shifts in different views of a local pixel and global pixels as well. Displays implementing the 2D high resolution display in addition to a low resolution 3D display are able to display 3D and 2D data depending on a user's preference.

22 Claims, 6 Drawing Sheets

SUPER-RESOLUTION FROM 3D (3D TO 2D CONVERSION) FOR HIGH QUALITY 2D PLAYBACK

FIELD OF THE INVENTION

The present invention relates to the field of imaging. More specifically, the present invention relates to conversion of three dimensional (3D) data to two dimensional (2D) data, while maintaining high resolution of the 2D data.

BACKGROUND OF THE INVENTION

Three dimensional technology has been developing for over a century, yet has never been able to establish itself in the mainstream generally due to complexity and cost for the average user. The emergence of Liquid Crystal Display (LCD) and Plasma screens which are better suited to rendering 3D images than traditional Cathode Ray Tube (CRT) monitors and televisions in both consumer electronics and the computer world has spurred interest in the technology. 3D systems have progressed from being technical curiosities and are now becoming practical acquisition and display systems for entertainment, commercial and scientific applications. With the boost in interest, many hardware and software companies are collaborating on 3D products.

NTT DoCoMo unveiled the Sharp mova SH251iS handset which is the first to feature a color screen capable of rendering 3D images. A single digital camera allows its user to take two dimensional (2D) images and, then using an editing system, convert them into 3D. The 3D images are sent to other phones with the recipient able to see the 3D images if they own a similarly equipped handset. No special glasses are required to view the 3D images on the auto-stereoscopic system. There are a number of problems with this technology though. In order to see quality 3D images, the user has to be positioned directly in front of the phone and approximately one foot away from its screen. If the user then moves slightly he will lose focus of the image. Furthermore, since only one camera is utilized, it can only take a 2D image and then via the 3D editor, the image is artificially turned into a 3D image. Quality of the image is therefore an issue.

The display can be improved though by utilizing a number of images, each spaced apart by 65 mm. With a number of images, the viewer can move his head left or right and will still see a correct image. However, there are additional problems with this technique. The number of cameras required increases. For example, to have four views, four cameras are used. Also, since the sets of numbers are repeating, there will still be a position that results in a reverse 3D image, just fewer of them. The reverse image can be overcome by inserting a null or black field between the repeating sets. The black field will remove the reverse 3D issue, but then there are positions where the image is no longer 3D. Furthermore, the number of black fields required is inversely proportional to the number of cameras utilized such that the more cameras used, the fewer black fields required. Hence, the multi-image display has a number of issues that need to be overcome for the viewer to enjoy his 3D experience.

As 3D display devices are emerging in the consumer market, the content of 3D images/videos are used. New content is able to be generated using a 3D image acquisition camera. The focus recently has also been on 2D data conversion to 3D data.

SUMMARY OF THE INVENTION

A display is able to display 3D content in high resolution 2D by utilizing the many views contained in the 3D data and converting the 3D data into 2D data. In some embodiments, the 3D data is converted using shifts in different views of a pixel. In some embodiments, the 3D is converted using shifts in different views of a local pixel and global pixels as well. Displays implementing the 2D high resolution display in addition to a low resolution 3D display are able to display both 3D and 2D data depending on a user's preference.

In one aspect, a device for displaying a low resolution three dimensional image as a high resolution two dimensional image comprises a conversion mechanism for converting the low resolution three dimensional image into the high resolution two dimensional image and a screen for displaying the high resolution two dimensional image. The conversion mechanism utilizes different views of the three dimensional image to generate the two dimensional image. The conversion mechanism utilizes a shift in each of the different views of the three dimensional image to generate the two dimensional image. The conversion mechanism utilizes only local different views of each pixel of the three dimensional image to generate the two dimensional image. The conversion mechanism utilizes local and global different views of each pixel of the three dimensional image to generate the two dimensional image. The three dimensional image comprises a plurality of images comprising a video.

In another aspect, a method of displaying an image comprises determining if the image is to be displayed as a two dimensional image or a three dimensional image, if the image is to be displayed as a two dimensional image, converting the image from a three dimensional image to the two dimensional image and displaying the two dimensional image and if the image is to be displayed as the three dimensional image, displaying the three dimensional image. Converting the image utilizes different views of the three dimensional image to generate the two dimensional image. Converting the image utilizes a shift in each of the different views of the three dimensional image to generate the two dimensional image. Converting the image utilizes only local different views of each pixel of the three dimensional image to generate the two dimensional image. Converting the image utilizes local and global different views of each pixel of the three dimensional image to generate the two dimensional image. The three dimensional image comprises a plurality of images comprising a video.

In another aspect, a system programmed in a memory in a device for displaying high resolution two dimensional data comprises a conversion module for converting low resolution three dimensional data to the high resolution two dimensional data and a display module for displaying the high resolution two dimensional data. The conversion module utilizes different views of the three dimensional data to generate the two dimensional data. The conversion module utilizes a shift in each of the different views of the three dimensional data to generate the two dimensional data. The conversion module utilizes only local different views of each pixel of the three dimensional data to generate the two dimensional data. The conversion module utilizes local and global different views of each pixel of the three dimensional data to generate the two dimensional data. The data is selected from the group consisting of an image and a video.

In yet another aspect, a television device comprises a screen, a memory for storing an application, the application for converting three dimensional data to high resolution two dimensional data and displaying the high resolution two dimensional data on the screen and a processing component coupled to the memory, the processing component for processing the application. The application utilizes different views of the three dimensional data to generate the two dimensional data. The application utilizes a shift in each of the different views of the three dimensional data to generate the two dimensional data. The application utilizes only local different views of each pixel of the three dimensional data to generate the two dimensional data. The application utilizes local and global different views of each pixel of the three dimensional data to generate the two dimensional data.

In another aspect, a camera device comprises an image acquisition component for acquiring a low resolution three dimensional image, a memory for storing an application, the application for: determining whether to display the low resolution three dimensional image or the high resolution two dimensional image, if the high resolution two dimensional image is to be displayed: converting the low resolution three dimensional image to the high resolution two dimensional image and displaying the high resolution two dimensional image on the screen and if the low resolution three dimensional image is to be displayed, displaying the low resolution three dimensional image on the screen and a processing component coupled to the memory, the processing component for processing the application. Converting utilizes different views of the low resolution three dimensional data to generate the high resolution two dimensional data. Converting utilizes a shift in each of the different views of the three dimensional data to generate the two dimensional data. Converting utilizes only local different views of each pixel of the three dimensional data to generate the high resolution two dimensional data. Converting utilizes local and global different views of each pixel of the low resolution three dimensional data to generate the high resolution two dimensional data. The camera device further comprises a screen for displaying the low resolution three dimensional image or the high resolution two dimensional image. The camera device further comprises a second memory for storing the low resolution three dimensional image or the high resolution two dimensional image. The low resolution three dimensional image or the high resolution two dimensional image are transmitted to an external display. The low resolution three dimensional image or the high resolution two dimensional image are wirelessly transmitted to an external device selected from a server, a mobile phone and a television.

DETAILED DESCRIPTION OF THE PREFERRED EMBODIMENT

Although various three dimensional (3D) display devices are emerging, two dimensional (2D) display is still extremely important. Therefore, it will be beneficial for a device to be a hybrid, one that is able to switch between 3D and 2D display. When content is in a 2D format, the 2D content is able to be displayed as 2D or is able to be converted to 3D using any 2D-to-3D conversion implementation and is displayed as 3D. When content is in a 3D format, the 3D content is able to be displayed as 3D or is able to be converted to 2D using the method described herein and is displayed as 2D. 2D super-resolution of 3D images is able to be used to display 1 view of a high quality image on a display such as a 4 k×2 k display instead of the 9 views of the 3D image.

3D data is able to be captured using any implementation, for example, the implementation described in U.S. patent appication Ser. No. 12/916,146, filed Oct. 29, 2010 and entitled, "9-VIEW HD VIDEO AND STILL 3D CAPTURE SYSTEM," which is incorporated by reference herein. Using the 9-view HD capture system, 9 different views of an object are captured simultaneously, and a 3D image/video is generated using the views.

Figure 1:
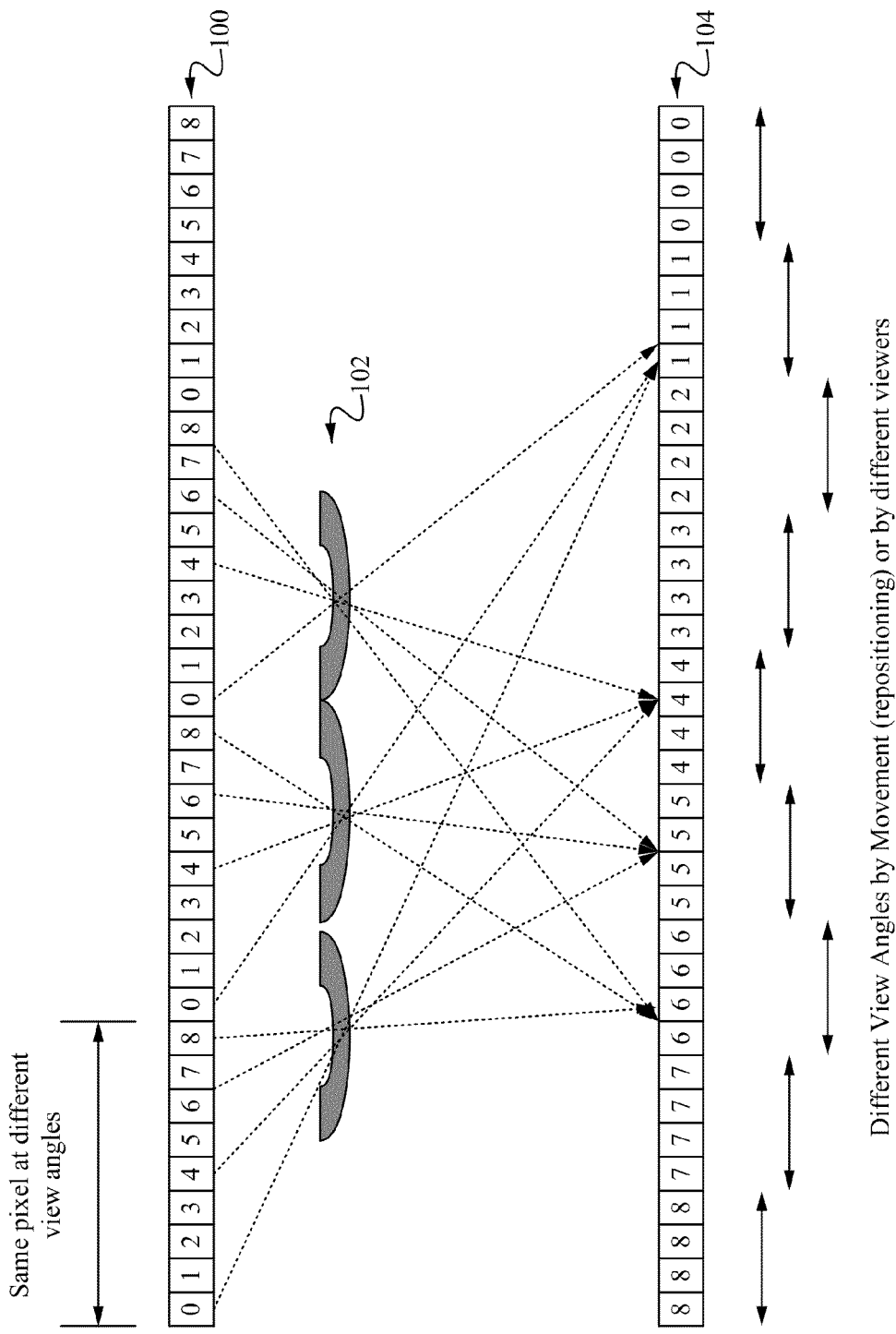
FIG. 1 illustrates a diagram of a 9-view auto-stereoscopic display according to some embodiments.

FIG. 1 illustrates a diagram of a 9-view auto-stereoscopic display according to some embodiments. Since there are 9 different views of an image, there are 9 versions of the same pixel but at different view angles. The 9 versions of each pixel are contained in a grouping 100. The viewer views the pixels depending on the angle of the viewer. The correct pixel is viewed through a lens 102 at the appropriate position of a display 104. For example, if the viewer is at the left of the screen, the viewer sees view 8 of each of the pixels. However, if the viewer is at the right of the screen, the viewer sees view 0 of each of the pixels. Similarly, if the viewer is somewhere in between, the viewer will see the corresponding view of the pixels.

Figure 2:
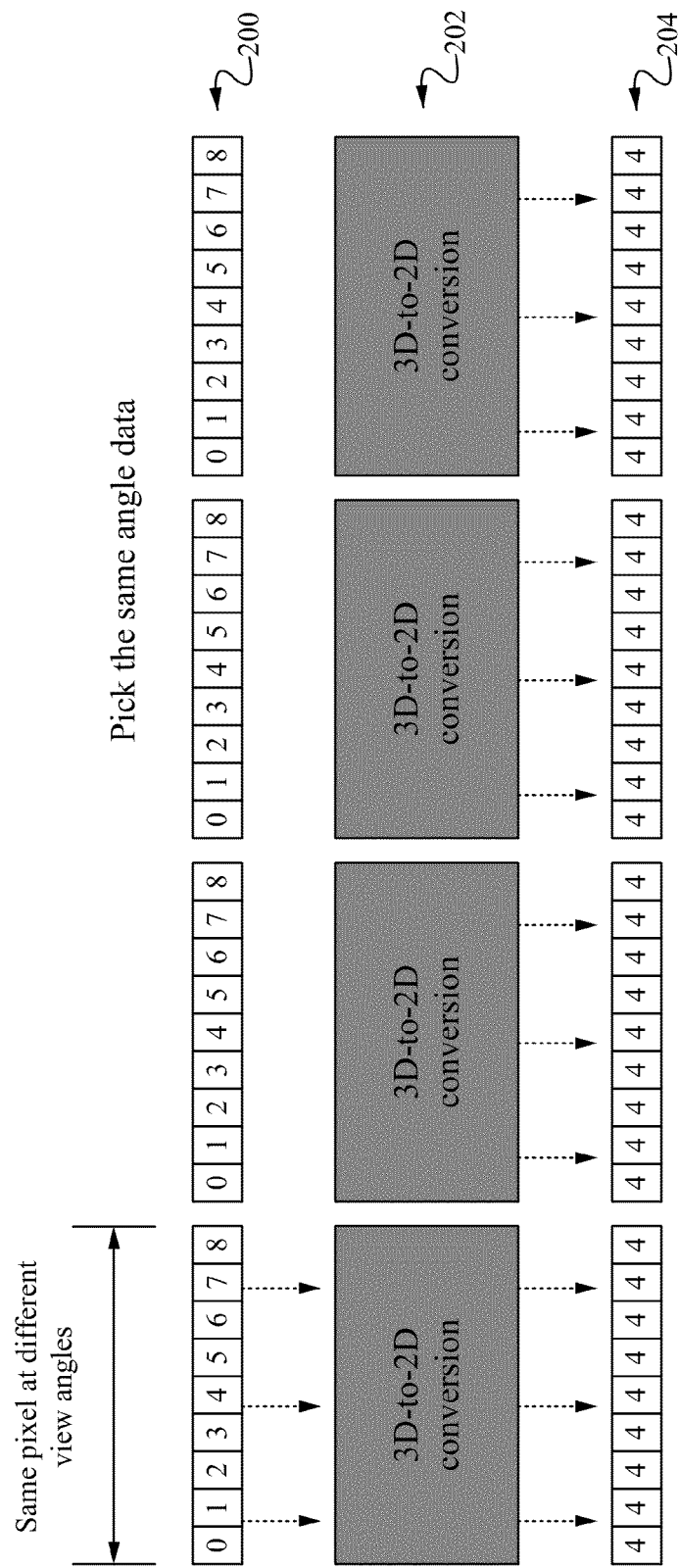
FIG. 2 illustrates a representation of 2D data displayed on a 9-view auto-stereoscopic display device according to some embodiments.

FIG. 2 illustrates a representation of 2D data displayed on a 9-view auto-stereoscopic display device according to some embodiments. Since there are 9 different views of an image, there are 9 versions of the same pixel but at different view angles. The 9 versions of each pixel are contained in a grouping 200. However, since the viewer is only viewing 2D, the viewer does not need the 9 different views. The different views are sent to a 3D-to-2D conversion 202 where a single view for each pixel is output 204. The 3D-to-2D conversion 202 works by generating super resolution using any implementation to generate a high resolution image from slight shifts in pixels. For example, each of the pixels has 9 different views of the same pixel. There is a slight shift in each of the views of the same pixel. The slight shift is able to be used to generate a single 2D high resolution image from the 9 versions of the image. In some embodiments, only views of the specific pixel (e.g. only local views of the pixel) are used in the 3D to 2D conversion to generate the 2D high resolution image. The 2D high resolution image is displayed on a screen such as a television screen.

Figure 3:
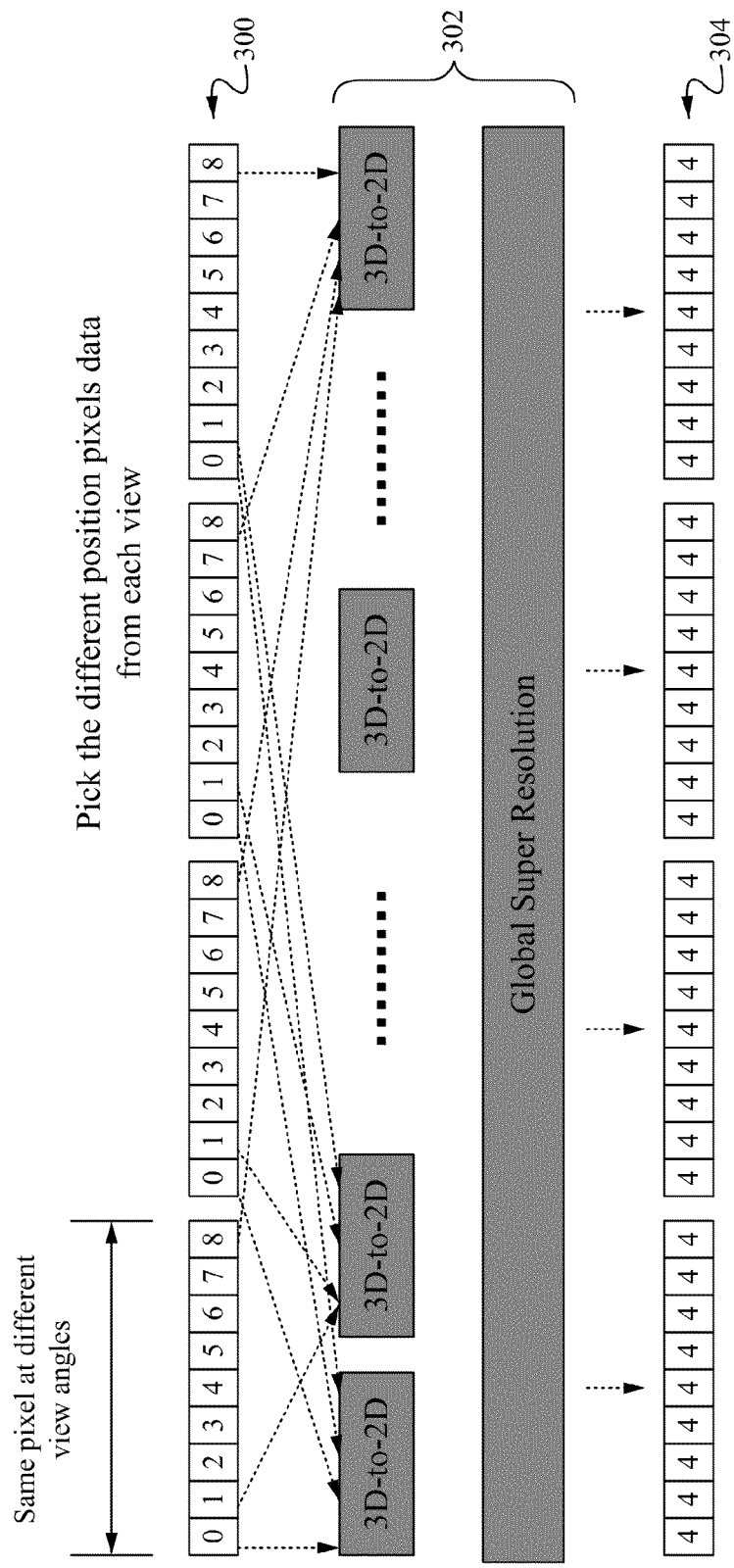
FIG. 3 illustrates a representation of 2D data displayed on a 9-view auto-stereoscopic display device according to some embodiments.

FIG. 3 illustrates a representation of 2D data displayed on a 9-view auto-stereoscopic display device according to some embodiments. Since there are 9 different views of an image, there are 9 versions of the same pixel but the pixel at different view angles. The 9 versions of each pixel are contained in a grouping 300. However, since the viewer is only viewing 2D, the viewer does not need the 9 different views. The different views are sent to a global 3D-to-2D conversion 302 where a single view for each pixel is output 304. The global 3D-to-2D conversion 302 works by generating super resolution using any implementation to generate a high resolution image from slight shifts in pixels. For example, each of the pixels has 9 different views of the same pixel. There is a slight shift in each of the views of the same pixel. The slight shift is able to be used to generate a single 2D high resolution image from the 9 versions of the image. In addition to using the 9 different views of the same pixel, views from other pixels are able to be used, hence global 3D-to-2D conversion. An example of global 3D-to-2D conversion is spatial super resolution. The 2D high resolution image is displayed on a screen such as a television screen.

Figure 4:
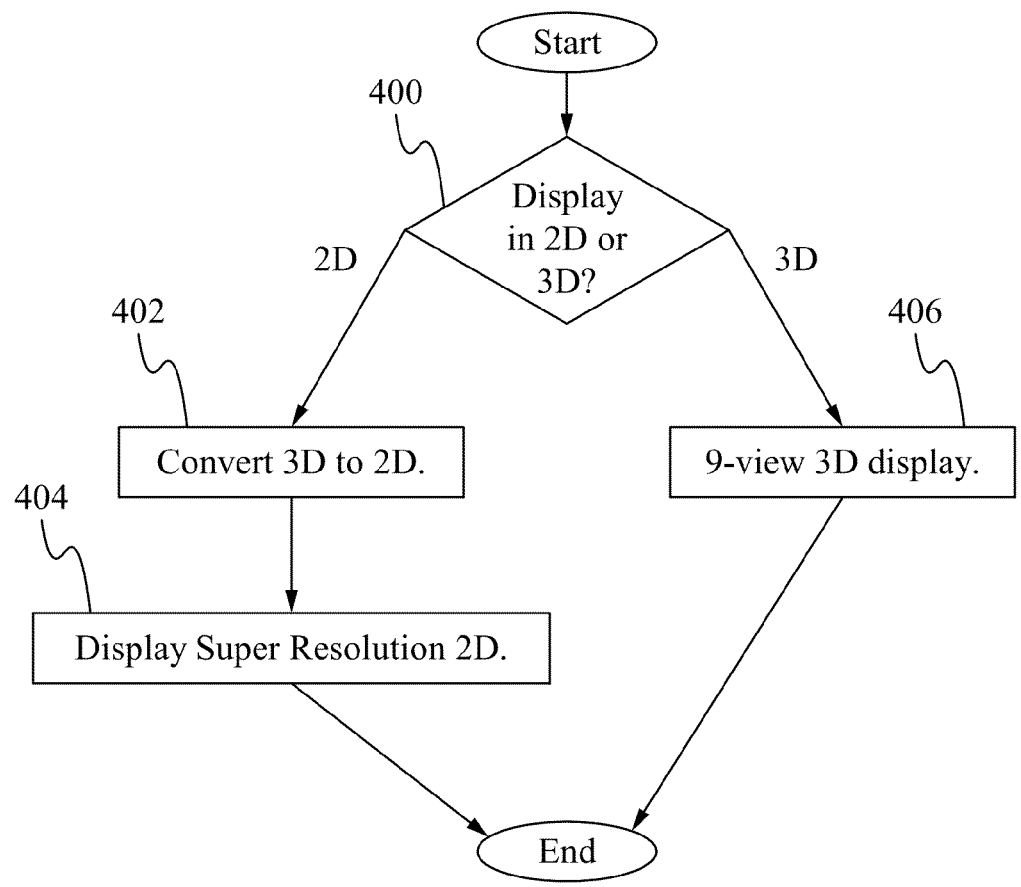
FIG. 4 illustrates a flowchart of displaying an image/video (e.g. media) according to some embodiments.

FIG. 4 illustrates a flowchart of displaying an image/video (e.g. media) according to some embodiments. In the step 400, it is determined if the media is to be displayed in 2D or 3D. If the media is to be displayed in 2D, in the step 402, the media is converted from 3D into 2D using the method described herein. For example, the disparities in the views of the 3D media are used to generate a high resolution 2D version of the media. Then, in the step 404, the 2D super resolution or high resolution media is displayed. If the media is to be displayed in 3D, it is displayed using any 3D display method. Fewer or additional steps are able to be included. Further, the order of the steps is able to be changed where possible.

Figure 5:
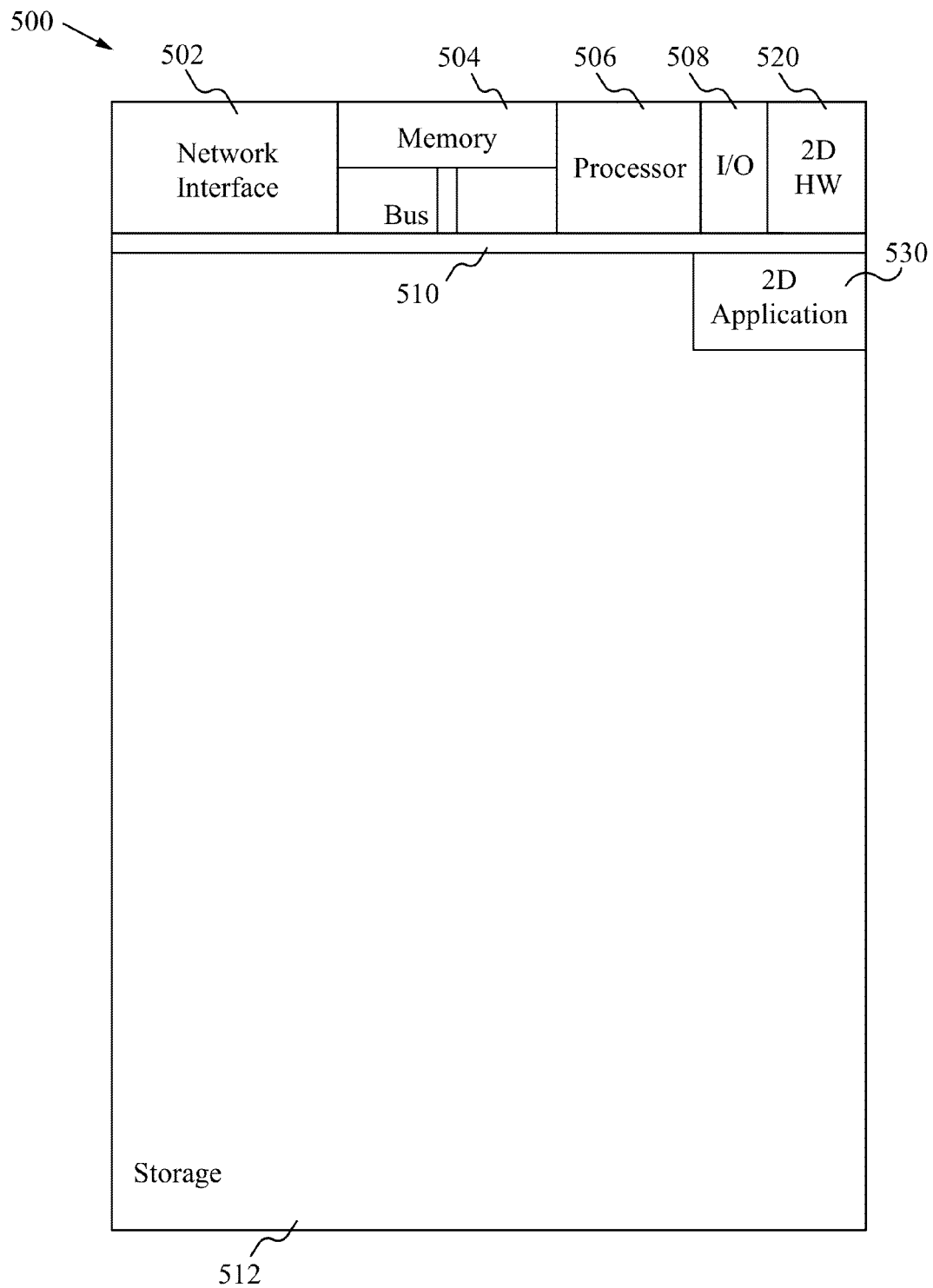
FIG. 5 illustrates a block diagram of an exemplary computing device configured to display high resolution 2D data and/or 3D data according to some embodiments.

FIG. 5 illustrates a block diagram of an exemplary computing device 500 configured to display high resolution 2D data and/or low resolution 3D data according to some embodiments. The computing device 500 is able to be used to acquire, store, compute, process, communicate and/or display information such as images and videos. For example, a computing device 500 is able to convert low resolution 3D data into high resolution 2D data and then display the high resolution 2D data. The computing device 500 is able to toggle between high resolution 2D and low resolution 3D data, for example, based on user selections. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. In some embodiments, the hardware structure includes multiple processors. 2D display application(s) 530 used to perform the high resolution 2D display are likely to be stored in the storage device 512 and memory 504 and processed as applications are typically processed. More or less components shown in FIG. 5 are able to be included in the computing device 500. In some embodiments, high resolution 2D display hardware 520 is included. Although the computing device 500 in FIG. 5 includes applications 530 and hardware 520 for high resolution 2D display, the 2D display is able to be implemented on a computing device in hardware, firmware, software or any combination thereof. For example, in some embodiments, the 2D display applications 530 are programmed in a memory and executed using a processor. In another example, in some embodiments, the 2D display hardware 520 is programmed hardware logic. In some embodiments, the 2D and/or 3D images/videos are stored in a second memory. In some embodiments, the 2D and/or 3D images/videos are transmitted (e.g. wirelessly) to an external device such as a display, a television, a server and/or a mobile device such as a mobile phone.

In some embodiments, the 2D display application(s) 530 include several applications and/or modules. Modules such as a converting module for converting low resolution 3D image with many views to a high resolution 2D image, and a display module for displaying the high resolution 2D image are described herein. In some embodiments, there is also an acquisition module for acquiring 3D data. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a camera, a camcorder, a digital camera, a digital camcorder, a camera phone, an iPod®/iPhone, a video player, a DVD writer/player, a Blu-ray® writer/player, a television, a home entertainment system or any other suitable computing device.

Figure 6:
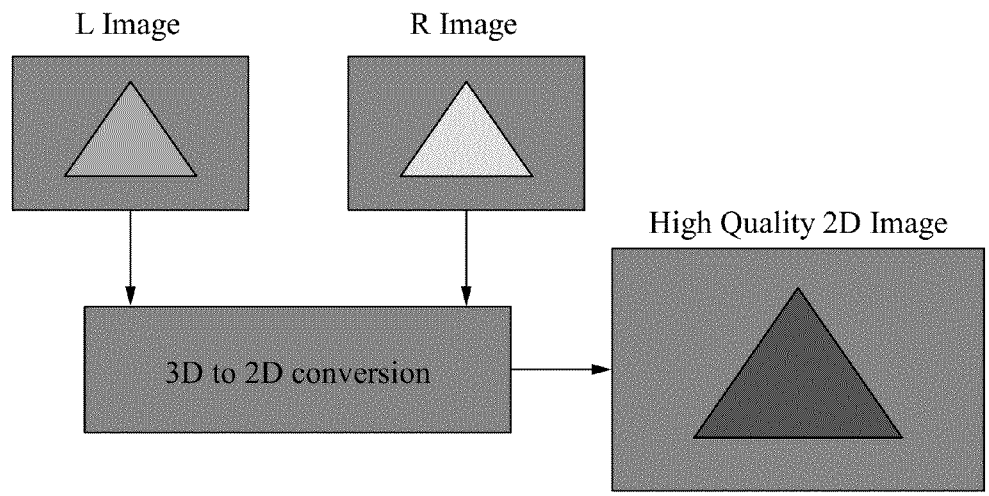
FIG. 6 illustrates an example of conversion from a 3D image to a high resolution 2D image according to some embodiments.

FIG. 6 illustrates an example of conversion from a 3D image to a high resolution 2D image according to some embodiments. A set of images for a stereoscopic 3D image are converted from 3D to 2D, and a high quality 2D image is generated.

Figure 7:
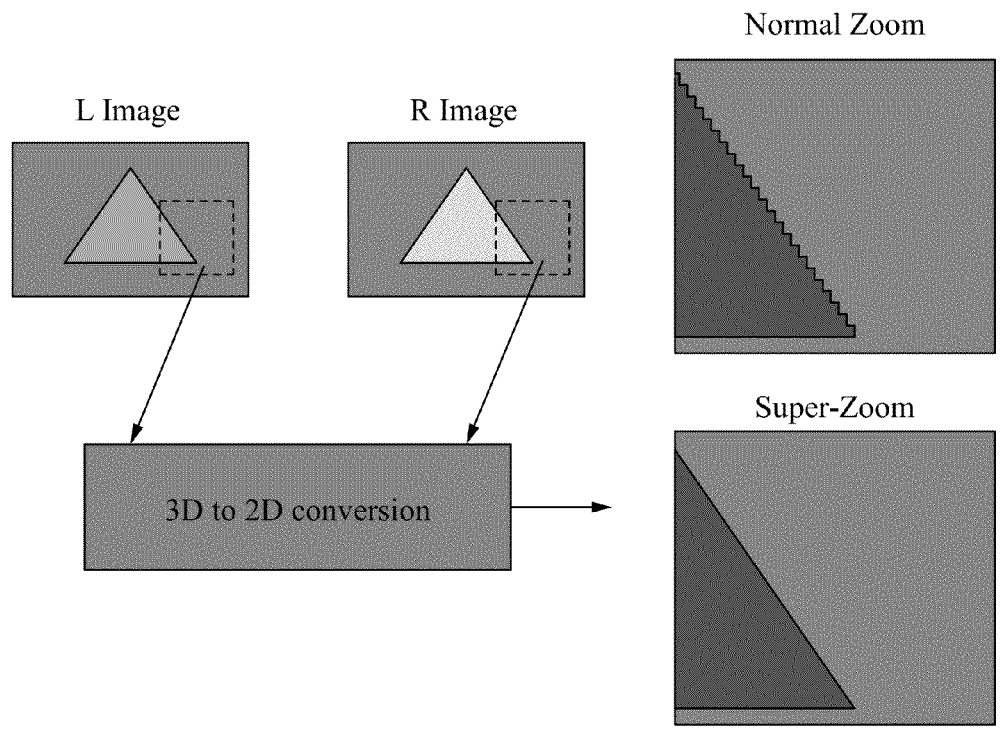
FIG. 7 illustrates an example of conversion from a 3D image to a high resolution 2D image according to some embodiments.

FIG. 7 illustrates an example of conversion from a 3D image to a high resolution 2D image according to some embodiments. A set of images for a stereoscopic 3D image are converted from 3D to 2D, and a high quality 2D image is generated. Since the converted 2D image is high quality, image editing tasks, such as zoom, are improved.

Although only two images (L and R) are shown in FIGS. 6 and 7, any number of images are able to be converted from 3D into 2D.

To utilize the 3D-to-2D super resolution conversion system, an image or video is displayed on display such as a television. Typically, the image/video was acquired in 3D or at least multiple images are captured from different angles simultaneously. The 3D image/video is converted to a 2D version without a significant loss of quality. The 3D to 2D conversion utilizes the multiple views of each of the pixels to generate super resolution pixels. In some embodiments, the views of a single pixel are used for converting that pixel, and in some embodiments, global views are used to convert the 3D data to 2D data. The user generally views the 2D high resolution image or video in a similar manner of watching standard images or television.

In operation, the 2D super resolution display enables a display to display 3D images or videos in 2D with a quality similar to HD. The 3D to 2D conversion implements any scheme that is able to generate a high quality 2D image using different views of a 3D image. The resulting converted 2D image is able to be displayed on the same display that the 3D image is displayed on and with a high quality. Without a proper conversion, if a simple implementation is utilized where only one view of the 3D image is utilized, the quality would be 1/9th of the original quality, thus very poor quality. The 2D super resolution display also enables a display to be toggled between a 2D and a 3D display.

Some Embodiments of Super-Resolution from 3D (3D to 2D Conversion) for High Quality 2D Playback 1. A device for displaying a low resolution three dimensional image as a high resolution two dimensional image comprising:
   a. a conversion mechanism for converting the low resolution three dimensional image into the high resolution two dimensional image; and
   b. a screen for displaying the high resolution two dimensional image.

2. The device of clause 1 wherein the conversion mechanism utilizes different views of the three dimensional image to generate the two dimensional image.
3. The device of clause 2 wherein the conversion mechanism utilizes a shift in each of the different views of the three dimensional image to generate the two dimensional image.
4. The device of clause 1 wherein the conversion mechanism utilizes only local different views of each pixel of the three dimensional image to generate the two dimensional image.
5. The device of clause 1 wherein the conversion mechanism utilizes local and global different views of each pixel of the three dimensional image to generate the two dimensional image.
6. The device of clause 1 wherein the three dimensional image comprises a plurality of images comprising a video.
7. A method of displaying an image comprising:
    a. determining if the image is to be displayed as a two dimensional image or a three dimensional image;
    b. if the image is to be displayed as a two dimensional image:
        i. converting the image from a three dimensional image to the two dimensional image; and
        ii. displaying the two dimensional image; and
    c. if the image is to be displayed as the three dimensional image, displaying the three dimensional image.
8. The method of clause 7 wherein converting the image utilizes different views of the three dimensional image to generate the two dimensional image.
9. The method of clause 8 wherein converting the image utilizes a shift in each of the different views of the three dimensional image to generate the two dimensional image.
10. The method of clause 7 wherein converting the image utilizes only local different views of each pixel of the three dimensional image to generate the two dimensional image.
11. The method of clause 7 wherein converting the image utilizes local and global different views of each pixel of the three dimensional image to generate the two dimensional image.
12. The method of clause 7 wherein the three dimensional image comprises a plurality of images comprising a video.
13. A system programmed in a memory in a device for displaying high resolution two dimensional data comprising:
    a. a conversion module for converting low resolution three dimensional data to the high resolution two dimensional data; and
    b. a display module for displaying the high resolution two dimensional data.
14. The system of clause 13 wherein the conversion module utilizes different views of the three dimensional data to generate the two dimensional data.
15. The system of clause 14 wherein the conversion module utilizes a shift in each of the different views of the three dimensional data to generate the two dimensional data.
16. The system of clause 13 wherein the conversion module utilizes only local different views of each pixel of the three dimensional data to generate the two dimensional data.
17. The system of clause 13 wherein the conversion module utilizes local and global different views of each pixel of the three dimensional data to generate the two dimensional data.
18. The system of clause 13 wherein the data is selected from the group consisting of an image and a video.
19. A television device comprising:
    a. a screen;
    b. a memory for storing an application, the application for:
        i. converting low resolution three dimensional data to high resolution two dimensional data; and
        ii. displaying the high resolution two dimensional data on the screen; and
    c. a processing component coupled to the memory, the processing component for processing the application.
20. The television device of clause 19 wherein the application utilizes different views of the three dimensional data to generate the two dimensional data.
21. The television device of clause 20 wherein the application utilizes a shift in each of the different views of the three dimensional data to generate the two dimensional data.
22. The television device of clause 19 wherein the application utilizes only local different views of each pixel of the three dimensional data to generate the two dimensional data.
23. The television device of clause 19 wherein the application utilizes local and global different views of each pixel of the three dimensional data to generate the two dimensional data.
24. A camera device comprising:
    a. an image acquisition component for acquiring a low resolution three dimensional image;
    b. a memory for storing an application, the application for:
        i. determining whether to display the low resolution three dimensional image or the high resolution two dimensional image;
        ii. if the high resolution two dimensional image is to be displayed:
            (1) converting the low resolution three dimensional image to the high resolution two dimensional image; and
            (2) displaying the high resolution two dimensional image; and
        iii. if the low resolution three dimensional image is to be displayed, displaying the low resolution three dimensional image; and
    c. a processing component coupled to the memory, the processing component for processing the application.
25. The camera device of clause 24 wherein converting utilizes different views of the three dimensional data to generate the two dimensional data.
26. The camera device of clause 25 wherein converting utilizes a shift in each of the different views of the three dimensional data to generate the two dimensional data.
27. The camera device of clause 24 wherein converting utilizes only local different views of each pixel of the three dimensional data to generate the two dimensional data.
28. The camera device of clause 24 wherein converting utilizes local and global different views of each pixel of the three dimensional data to generate the two dimensional data.
29. The camera device of clause 24 further comprising a screen for displaying the low resolution three dimensional image or the high resolution two dimensional image.
30. The camera device of clause 24 further comprising a second memory for storing the low resolution three dimensional image or the high resolution two dimensional image.
31. The camera device of clause 24 wherein the low resolution three dimensional image or the high resolution two dimensional image are transmitted to an external display.
32. The camera device of clause 24 wherein the low resolution three dimensional image or the high resolution two dimensional image are wirelessly transmitted to an external device selected from a server, a mobile phone and a television.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A device for displaying a low resolution three dimensional image as a high resolution two dimensional image comprising:
   a. a conversion mechanism for converting the low resolution three dimensional image into the high resolution two dimensional image, wherein the conversion mechanism utilizes different view angles of the three dimensional image to generate the two dimensional image, wherein the conversion mechanism utilizes a shift in each of the different view angles of the three dimensional image to generate the two dimensional image; and
   b. a screen for displaying the high resolution two dimensional image.

2. The device of claim 1 wherein the conversion mechanism utilizes only local different views of each pixel of the three dimensional image to generate the two dimensional image.

3. The device of claim 1 wherein the conversion mechanism utilizes local and global different views of each pixel of the three dimensional image to generate the two dimensional image.

4. The device of claim 1 wherein the three dimensional image comprises a plurality of images comprising a video.

5. A method of displaying an image comprising:
   a. determining if the image is to be displayed as a two dimensional image or a three dimensional image;
   b. if the image is to be displayed as a two dimensional image:
      i. converting the image from a three dimensional image to the two dimensional image, wherein converting the image utilizes different view angles of the three dimensional image to generate the two dimensional image, wherein converting the image utilizes a shift in each of the different view angles of the three dimensional image to generate the two dimensional image; and
      ii. displaying the two dimensional image; and
   c. if the image is to be displayed as the three dimensional image, displaying the three dimensional image.

6. The method of claim 5 wherein converting the image utilizes only local different views of each pixel of the three dimensional image to generate the two dimensional image.

7. The method of claim 5 wherein converting the image utilizes local and global different views of each pixel of the three dimensional image to generate the two dimensional image.

8. The method of claim 5 wherein the three dimensional image comprises a plurality of images comprising a video.

9. A system programmed in a memory in a device for displaying high resolution two dimensional data comprising:
   a. a conversion module for converting low resolution three dimensional data to the high resolution two dimensional data, wherein the conversion module utilizes different view angles of the three dimensional data to generate the two dimensional data, wherein the conversion module utilizes a shift in each of the different view angles of the three dimensional data to generate the two dimensional data; and
   b. a display module for displaying the high resolution two dimensional data.

10. The system of claim 9 wherein the conversion module utilizes only local different views of each pixel of the three dimensional data to generate the two dimensional data.

11. The system of claim 9 wherein the conversion module utilizes local and global different views of each pixel of the three dimensional data to generate the two dimensional data.

12. The system of claim 9 wherein the data is selected from the group consisting of an image and a video.

13. A television device comprising:
   a. a screen;
   b. a memory for storing an application, the application for:
      i. converting low resolution three dimensional data to high resolution two dimensional data, wherein the application utilizes only local different view angles of each pixel of the three dimensional data to generate the two dimensional data; and
      ii. displaying the high resolution two dimensional data on the screen; and
   c. a processing component coupled to the memory, the processing component for processing the application.

14. The television device of claim 13 wherein the application utilizes different views of the three dimensional data to generate the two dimensional data.

15. The television device of claim 14 wherein the application utilizes a shift in each of the different views of the three dimensional data to generate the two dimensional data.

16. A camera device comprising:
   a. an image acquisition component for acquiring a low resolution three dimensional image;
   b. a memory for storing an application, the application for:
      i. determining whether to display the low resolution three dimensional image or the high resolution two dimensional image;
      ii. if the high resolution two dimensional image is to be displayed:
         (1) converting the low resolution three dimensional image to the high resolution two dimensional image, wherein converting utilizes local and global different view angles of each pixel of the three dimensional data to generate the two dimensional data; and
         (2) displaying the high resolution two dimensional image; and
      iii. if the low resolution three dimensional image is to be displayed, displaying the low resolution three dimensional image; and
   c. a processing component coupled to the memory, the processing component for processing the application.

17. The camera device of claim 16 wherein converting utilizes different views of the three dimensional data to generate the two dimensional data.

18. The camera device of claim 17 wherein converting utilizes a shift in each of the different views of the three dimensional data to generate the two dimensional data.

19. The camera device of claim 16 further comprising a screen for displaying the low resolution three dimensional image or the high resolution two dimensional image.

20. The camera device of claim 16 further comprising a second memory for storing the low resolution three dimensional image or the high resolution two dimensional image.

21. The camera device of claim 16 wherein the low resolution three dimensional image or the high resolution two dimensional image are transmitted to an external display.

22. The camera device of claim 16 wherein the low resolution three dimensional image or the high resolution two dimensional image are wirelessly transmitted to an external device selected from a server, a mobile phone and a television.

* * * * *